United States Patent
Morris

(10) Patent No.: US 10,266,255 B2
(45) Date of Patent: Apr. 23, 2019

(54) DRIVE SYSTEM FOR AIRCRAFT LANDING GEAR

(71) Applicant: AIRBUS OPERATIONS LIMITED, Bristol (GB)

(72) Inventor: James Morris, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 357 days.

(21) Appl. No.: 15/301,120

(22) PCT Filed: Mar. 31, 2015

(86) PCT No.: PCT/GB2015/050979
§ 371 (c)(1),
(2) Date: Sep. 30, 2016

(87) PCT Pub. No.: WO2015/150776
PCT Pub. Date: Oct. 8, 2015

(65) Prior Publication Data
US 2017/0197707 A1    Jul. 13, 2017

(30) Foreign Application Priority Data
Apr. 1, 2014 (GB) .................................. 1405849.9

(51) Int. Cl.
*B64C 25/40* (2006.01)
*F16H 1/24* (2006.01)
(Continued)

(52) U.S. Cl.
CPC ............ *B64C 25/405* (2013.01); *B64C 25/42* (2013.01); *F16H 1/24* (2013.01); *H02P 31/00* (2013.01); *Y02T 50/823* (2013.01)

(58) Field of Classification Search
CPC ....... B64C 25/40; B64C 25/42; B64C 25/405; F16H 55/10; H03J 1/06; Y02T 50/823
See application file for complete search history.

(56) References Cited

U.S. PATENT DOCUMENTS

2011/0308490 A1    12/2011 Hartmann et al.
2012/0312112 A1    12/2012 Tizac
(Continued)

FOREIGN PATENT DOCUMENTS

EP    2527249 A1    11/2012
EP    2581305 A1    4/2013
(Continued)

OTHER PUBLICATIONS

International Search Report and Written Opinion of the ISA dated Jul. 6, 2015 International Application No. PCT/GB2015/050979.
(Continued)

*Primary Examiner* — Timothy D Collins
*Assistant Examiner* — Tye William Abell
(74) *Attorney, Agent, or Firm* — Nixon & Vanderhye P.C.

(57) ABSTRACT

A method of engaging a drive system with a rotating wheel of an aircraft landing gear is disclosed. A motor is operated to apply torque to a pinion so the pinion rotates. An engagement command is issued to an actuator at an engagement time, and the actuator operates the actuator in response to the engagement command to move the pinion from a neutral position to a contact position in which it contacts a rotating driven gear at an initial contact time, the rotating driven gear being mounted to a rotating wheel of an aircraft landing gear; then after the initial contact time operating the actuator to move the pinion further to a meshing position where the pinion meshes with the driven gear. A centre-to-centre distance between the pinion and the driven gear reduces as the pinion moves to the contact position and to the meshing position.

13 Claims, 9 Drawing Sheets

(51) Int. Cl.
*H02P 31/00* (2006.01)
*B64C 25/42* (2006.01)

(56) References Cited

U.S. PATENT DOCUMENTS

| | | | |
|---|---|---|---|
| 2013/0091969 A1 | 4/2013 | Bucheton | |
| 2013/0200210 A1* | 8/2013 | Oswald | B64C 25/405 244/50 |
| 2013/0221682 A1* | 8/2013 | Bradfield | F02N 11/0855 290/38 C |
| 2014/0225421 A1* | 8/2014 | Oswald | B64C 25/405 301/6.2 |
| 2014/0245853 A1* | 9/2014 | Didey | B64C 25/405 74/421 A |
| 2014/0336847 A1* | 11/2014 | Cox | B64C 25/405 701/3 |
| 2015/0210385 A1 | 7/2015 | Didey | |

FOREIGN PATENT DOCUMENTS

| | | | |
|---|---|---|---|
| EP | 2653713 | 10/2013 | |
| EP | 2677159 | 12/2013 | |
| GB | 2228461 A * | 8/1990 | ........... B62D 5/0409 |
| JP | 2012127306 | 7/2012 | |
| JP | 2012172532 | 9/2012 | |
| WO | 2014023939 A1 | 2/2014 | |
| WO | 2014023941 A1 | 2/2014 | |

OTHER PUBLICATIONS

English translation for Notification of Reason for Refusal for Japanese Application No. 2016-560349, three pages, dated Feb. 5, 2019.

* cited by examiner

DRIVE SYSTEM FOR AIRCRAFT LANDING GEAR

RELATED APPLICATIONS

The present application is a National Phase of International Application Number PCT/GB2015/050979, filed Mar. 31, 2015, which claims priority from Great Britain Application Number 1405849.9, filed Apr. 1, 2014.

FIELD OF THE INVENTION

The present invention relates to a method of engaging a drive system with a rotating wheel of an aircraft landing gear. The present invention also relates to a drive system for rotating one or more wheels of an aircraft landing gear for the purposes of ground taxiing (forwards or reverse) and/or wheel spin-up prior to landing and/or for applying braking torque to the rotating wheel(s).

BACKGROUND OF THE INVENTION

Aircraft are required to ground taxi between locations on airfields. An example is taxiing between a runway and the location (e.g. terminal gate) at which the aircraft's passengers are to board or disembark. Typically, such taxiing is achieved by using the thrust from the aircraft's engines to propel the aircraft forwards so that the landing gear wheels are caused to rotate. Since ground taxi speeds are necessarily relatively low, the engines must be run at a very low power. This means that there is a relatively high fuel consumption as a result of the poor propulsion efficiency at this low power. This leads to an increased level of both atmospheric and noise pollution locally around airports. Moreover, even when the engines are run at low power it is generally necessary to apply the wheel brakes to limit ground taxi speeds, leading to a high degree of brake wear.

Reversing of a civil aircraft, e.g. away from a terminal gate, using its main engines is not permitted. When reversing is necessary, or in other situations where ground taxiing via main engine thrust is not practicable, tow trucks are used to manoeuvre aircraft around. This process is laborious and costly.

There is therefore a need for a drive system to power the wheels of an aircraft landing gear during ground taxi operations. There is also a desire to use such a drive system to pre-spin the wheels prior to landing, so that the wheels are already spinning at, or near, their initial landing speed on touch down. Such pre-landing spin-up is perceived to reduce tyre wear on landing, and reduce loads transmitted to the landing gear during landing.

A known method of engaging a drive system with a wheel of an aircraft landing gear is described in WO2014/023939. An actuator is arranged to rotate a drive system between a position in which a sprocket engages a roller chain, and a position in which the sprocket is not able to engage the roller chain.

SUMMARY OF THE INVENTION

A first aspect of the invention provides a method of engaging a drive system with a rotating wheel of an aircraft landing gear, the method comprising operating a motor to apply torque to a pinion so the pinion rotates; issuing an engagement command to an actuator at an engagement time; operating the actuator in response to the engagement command to move the pinion from a neutral position to a contact position in which it contacts a rotating driven gear at an initial contact time, the rotating driven gear being mounted to a rotating wheel of an aircraft landing gear; then after the initial contact time operating the actuator to move the pinion further to a meshing position where the pinion meshes with the driven gear, wherein a centre-to-centre distance between the pinion and the driven gear reduces as the pinion moves to the contact position and to the meshing position, and the method further comprises operating the motor to reduce the torque to below a predetermined level at or after the engagement time, maintain the torque below the predetermined level until the initial contact time, then after the initial contact time increase the torque above the predetermined level.

A second aspect of the invention provides a drive system for rotating a wheel of an aircraft landing gear, the drive system comprising a pinion; a driven gear adapted to be mounted to a wheel of an aircraft landing gear; a motor arranged to apply torque to the pinion so the pinion rotates; an actuator which is responsive to an engagement command at an engagement time to move the pinion from a neutral position to a contact position in which it contacts the driven gear at an initial contact time; then after the initial contact time to move the pinion further to a meshing position where the pinion meshes with the driven gear, wherein a centre-to-centre distance between the pinion and the driven gear reduces as the pinion moves to the contact position and to the meshing position, and the drive system further comprises a controller which is configured to operate the motor to reduce the torque to below a predetermined level at or after the engagement time, maintain the torque below the predetermined level until the initial contact time, then after the initial contact time increase the torque above the predetermined level.

The motor reduces the torque during a spin-down phase, then re-applies torque after the initial contact time (i.e. at the end of the spin-down phase).

The reduction in torque may be initiated by a trigger signal, which may be the engagement command or some other trigger signal.

The torque may be increased above the predetermined ore or after the pinion has moved to the meshing position.

Preferably the driven gear has $N_{gear}$ teeth or rollers, the pinion has $N_{pinion}$ teeth or rollers which mesh with the teeth or rollers of the driven gear when the pinion is at the meshing position. The pinion and driven gear are rotating at angular velocities $\omega_{pinion}$ and $\omega_{gear}$ respectively at the initial contact time, and preferably a sync ratio $[(\omega_{pinion}*N_{pinion})/(\omega_{gear}*N_{gear})]$ at the initial contact time is not 1. The sync ratio may be greater than 1 (for instance greater than 1.02) but more preferably it is less than 1 (for instance less than 0.98 or less than 0.96).

Optionally a sensor is arranged to detect an angular velocity $\omega_{gear}$ of the driven gear; a control loop is provided which is responsive to a velocity demand input to control the motor so that it rotates at an angular velocity determined by the velocity demand input; and a controller is arranged to determine the velocity demand input in accordance with a gear ratio ($N_{pinion}/N_{gear}$), the angular velocity of the driven gear detected by the sensor, and a predetermined sync ratio, wherein the predetermined sync ratio is chosen so that the pinion is rotating at an angular velocity $\omega_{pinion}$ at the initial contact time and $[(\omega_{pinion}*N_{pinion})/(\omega_{gear}*N_{gear})]$ is not 1.

Typically the driven gear contacts the pinion in a series of impacts as the pinion moves from the contact position to the meshing position, and each impact induces a spike in electromotive force or angular velocity at the motor. Optionally the method further comprises detecting one of the spikes and operating the motor to vary the torque applied to the pinion in response to the detection of one of the spikes. Optionally the method further comprises detecting a polarity of the one of the spikes and operating the motor to vary the torque applied to the pinion in accordance with the detected polarity. The drive system may comprise a sensor arranged to detect the spikes; and a controller which is configured to operate the motor to vary the torque applied to the pinion in response to the detection of one of the spikes by the sensor.

In some embodiments the pinion or driven gear may comprise a roller gear comprising a series of rollers which mesh with teeth of the driven gear or pinion respectively. An advantage of a roller gear is that it is more tolerant of wheel deformation and misalignment between pinion and driven gear than meshing toothed gear arrangements. Each of the series of rollers may he rotatable about a pin, the pins optionally being supported by an annular support member, or between two annular support members. In other embodiments the series of rollers may be provided by a roller chain (also known as an attachment chain, or attachment roller chain) extending around an outer circumference of a support member and being fixed thereto. This arrangement may be less expensive to implement than the roller gear arrangement discussed above.

BRIEF DESCRIPTION OF THE DRAWINGS

Embodiments of the invention will now be described with reference to the accompanying drawings, in which.

DETAILED DESCRIPTION OF EMBODIMENT(S)

The illustrated embodiments are shown applied to an aircraft landing gear which has two wheels, but the principles of the embodiments may be applied to landing gear with any number of wheels including only a single wheel. The embodiments are applied to a main landing gear (i.e. a landing gear attached to wing structure or fuselage structure in the region of the wings), since the weight supported by the main landing gear is considered to provide the best traction between the wheels and the ground to enable reliable aircraft ground taxiing. However, the drive system of the present invention may alternatively be applied to a nose landing gear (i.e. a steerable landing gear towards the nose of the aircraft). The main landing gear shown is applicable to a single aisle passenger airliner (approximately 1.50-200 pax), although it will be appreciated that this invention has wide applicability to a variety of aircraft types and weights, including civil aircraft, military aircraft, helicopters, passenger aircraft (<50 pax, 100-150 pax, 150-250 pax, 250-450 pax, >450 pax), freighters, tilt-rotor aircraft, etc.

Figure 1:
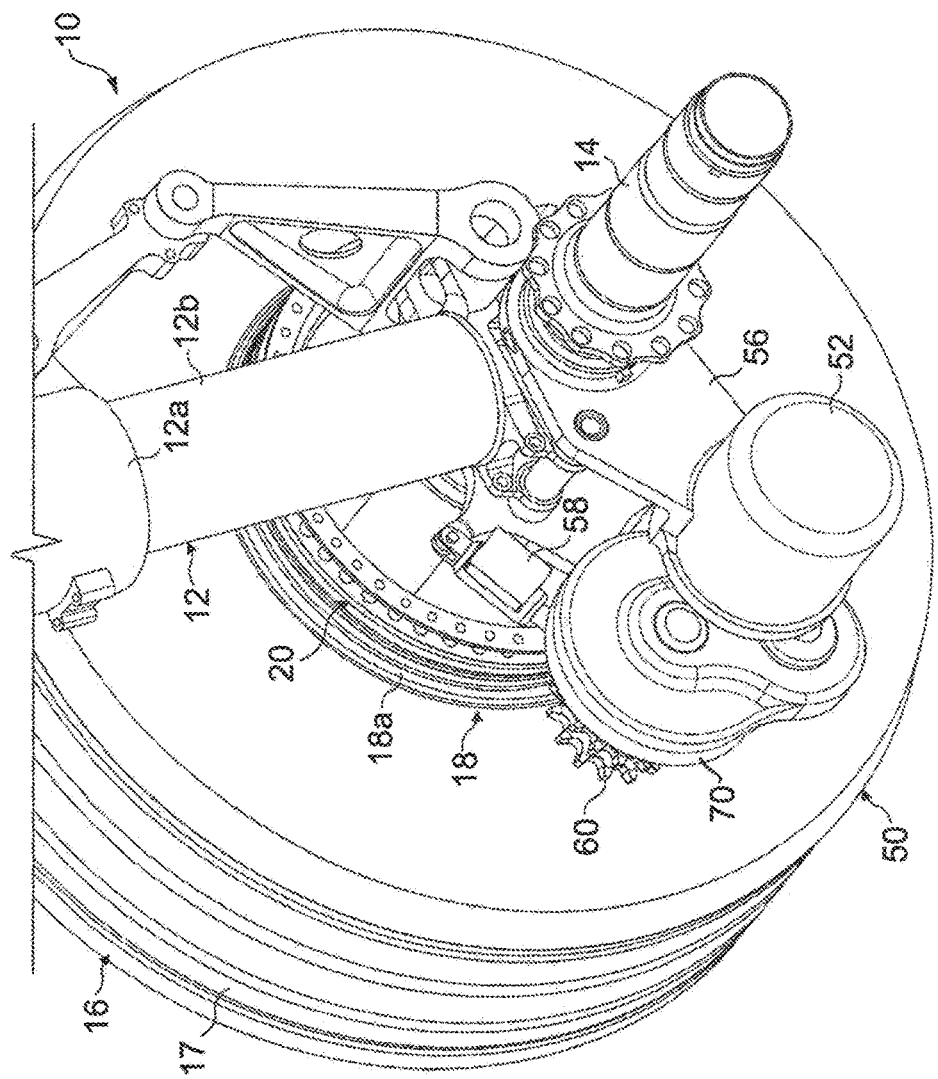
FIG. 1 shows an isometric view of a drive system according to a first embodiment.
Figure 2:
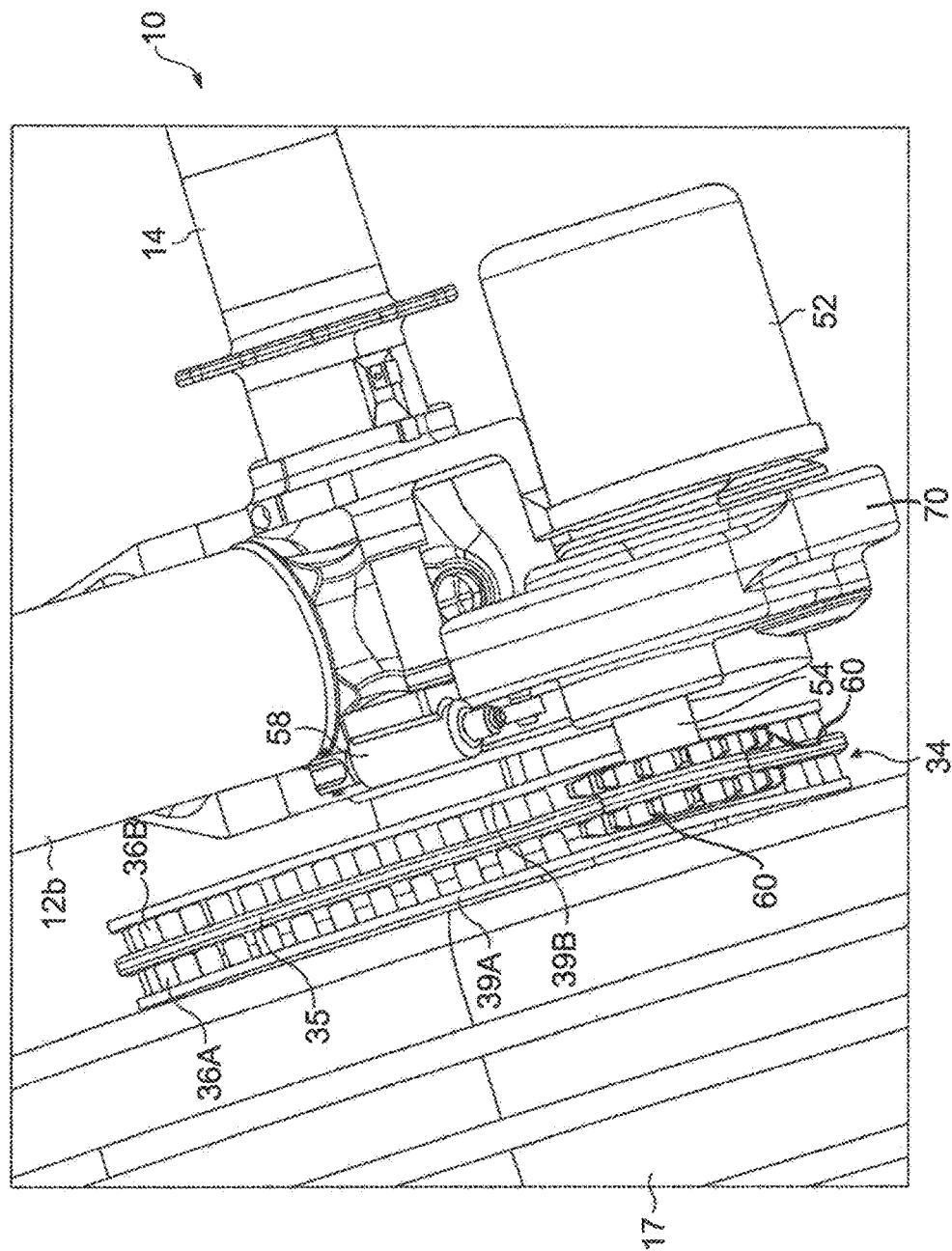
FIG. 2 shows a further isometric view of the drive system of FIG. 1.

The landing gear 10 includes a telescopic shock absorbing main leg 12, including an upper telescopic part 12a (main fitting) and a lower telescopic part 12b (the slider) The upper telescopic part 12a is attached to the aircraft fuselage or wing (not shown) by its upper end (not shown). The lower telescopic part 12b supports an axle 14 carrying a pair of wheels 16, one on either side of the main leg (only one wheel 16 is shown in FIGS. 1 and 2, for clarity). The wheels 16 are arranged to rotate about the axle 14 to enable ground movement of the aircraft, such as taxiing or landing.

Each wheel 16 comprises a tyre 17 supported by a hub 18 having a rim 18a at its outer edge which holds the tyre 17. A driven gear 20 is attached to the hub 18 (preferably at the rim 18a) so as to be rotatable with the wheel 16. The driven gear 20 may be attached to the wheel 16 by a plurality of discrete couplings, which may provide a rigid or flexible attachment. Alternatively, the attachment may be via a flange forming a continuous extension rim projecting axially from either the wheel 16 or the driven gear 20.

The drive system 50 includes a motor 52 which transmits torque to a drive shaft 54 via a gearbox 70. The drive system 50 is supported by a bracket 56 which is rigidly connected to the axle 14 of the landing gear. The bracket 56 includes two lugs comprising half moon clamps to permit ready attachment and detachment of the bracket 56 to the axle 14. The motor 52 is fixedly connected, e.g. by bolting, to the bracket 56. The gearbox 70 is pivotally connected to the bracket 56.

A drive pinion 60 is mounted on the drive shaft 54 so as to he rotatable by the drive shaft about a drive axis. The drive pinion 60, drive shaft 54 and gearbox 70 are pivotable by a linear actuator (positioner) 58, such as a direct drive roller screw electro mechanical linear actuator, which extends between the bracket 56 (at an end nearest the axle 15) and the gearbox 70, or more particularly the housing 84 of the gearbox. Thus, linear movement of the actuator 58 is translated into rotational movement of the gearbox 70 and the sprockets 60 about the pivot. The drive system 50 can therefore be between a neutral configuration (not shown) in which the drive pinion 60 does not mesh with the driven gear 20, and a driven configuration (shown in FIGS. 1 and 2) in which the drive pinion 60 is in meshed engagement with the driven gear 20. In the neutral configuration the wheel 16 is able to rotate freely, e.g. during take-off and landing, while in the driven configuration the wheel 16 can be driven by the drive system 50, e.g. during ground taxiing.

In the embodiment of FIGS. 1 and 2 the driven gear 20 comprises a roller gear 24 and the drive pinion 60 comprises a sprocket.

The roller gear is formed by a rigid annular ring 35 and a series of pins projecting from both sides of the annular ring 35. A first series of rollers 36a rotatably supported. by the pins is provided on one side of the annular ring 35, and a second series of rollers 36b rotatably supported by the pins as provided on the other side of the annular ring. Each series of rollers 36a, 36b extends around the annular ring to form a continuous track. First and second lateral annular rings 39a, 39b sandwich the first and second series of rollers 36a, 36b. The pins supporting the first series of rollers 36a extend between the annular ring 35 and the first lateral annular ring 39a, and the pins supporting the second series of rollers 36b extend between the annular ring 35 and the second lateral annular ring 39b. The annular ring 35 therefore forms a central spine for supporting the pins which are cantilevered off the central spine. The annular ring 35 comprises a plurality of axially extending connection extension tabs (not shown) providing mounting means for mounting the roller gear to the hub 18. Alternatively, the tabs may be substituted for the annular ring 35.

The drive pinion 60 comprises a sprocket having two coaxial rings of radially extending sprocket teeth which can interlock with the rollers 36 of the roller gear. That is, each ring of sprocket teeth is arranged to mesh with one of the rings of rollers of the driven gear 20.

Figure 3:
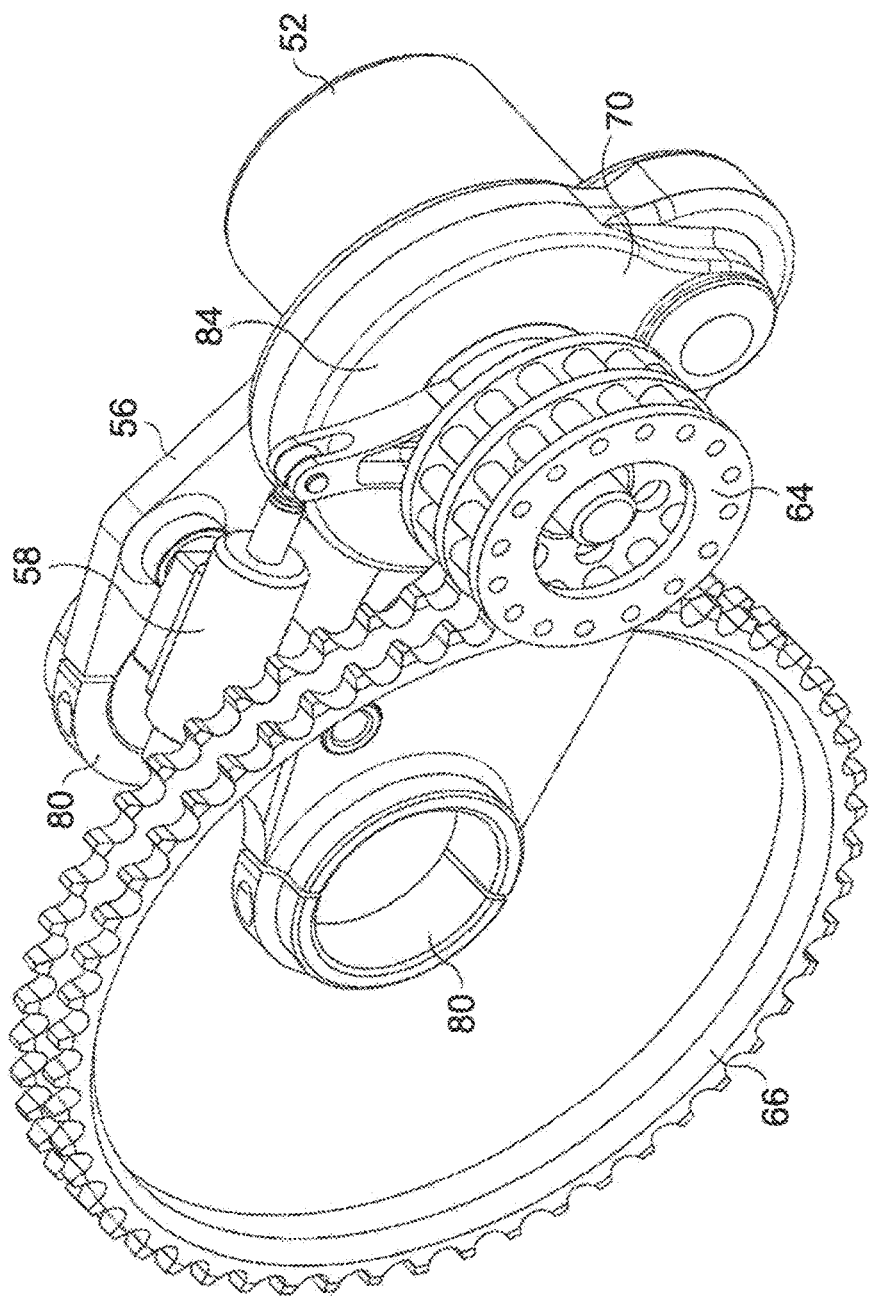
FIG. 3 shows an isometric view of selected components of a drive system according to a second embodiment.

FIG. 3 shows an alternative, and preferred, embodiment in which the driven gear comprises a sprocket instead of a roller gear, and the drive pinion comprises a roller gear instead of a sprocket. Thus, the drive pinion comprises a roller gear 64 having two coaxial rings of rollers and the driven gear 20 is replaced by sprocket 66 having two coaxial rings of sprocket teeth. In all other respects the drive system is identical to that described above with reference to FIGS. 1 and 2, and the features of the drive system described below apply equally to both embodiments. The roller gear 64 may be constructed similarly to the roller gear 34, although of course it has a much smaller diameter and therefore fewer rollers.

An advantage of the sprocket-roller gear arrangement is that it is more tolerant of wheel and axle deformation than meshing toothed gear arrangements. Landing gear wheels and axles are subject to high loads and consequential deformation during ground taxiing, and a driven gear fixed to the wheel will inevitably deform in response to such deformation. Meshing toothed gears are intolerant of such deformation and a typical toothed rim gear may need to be isolated from the wheel via bearings, a flexible interface, or similar. In contrast, the sprocket and roller arrangement of the present invention may be able to tolerate the deformation without such modification.

Such an arrangement also has the advantage of being lightweight and having high structural strength. The main failure mode of the rollers is via shear failure of the pins; by mounting each roller directly on its respective pin, with no intermediate sleeve, bush or other part, the diameter of the pin can be maximised to maximise shear strength.

In a further variation (not shown) the drive pinion may alternatively comprise a single ring of rollers for engaging with a driven gear formed as a sprocket (not shown) having a single row of sprocket teeth. The roller gear may take many forms, including a typical roller gear as in FIG. 3, or a roller chain gear.

Figure 4:
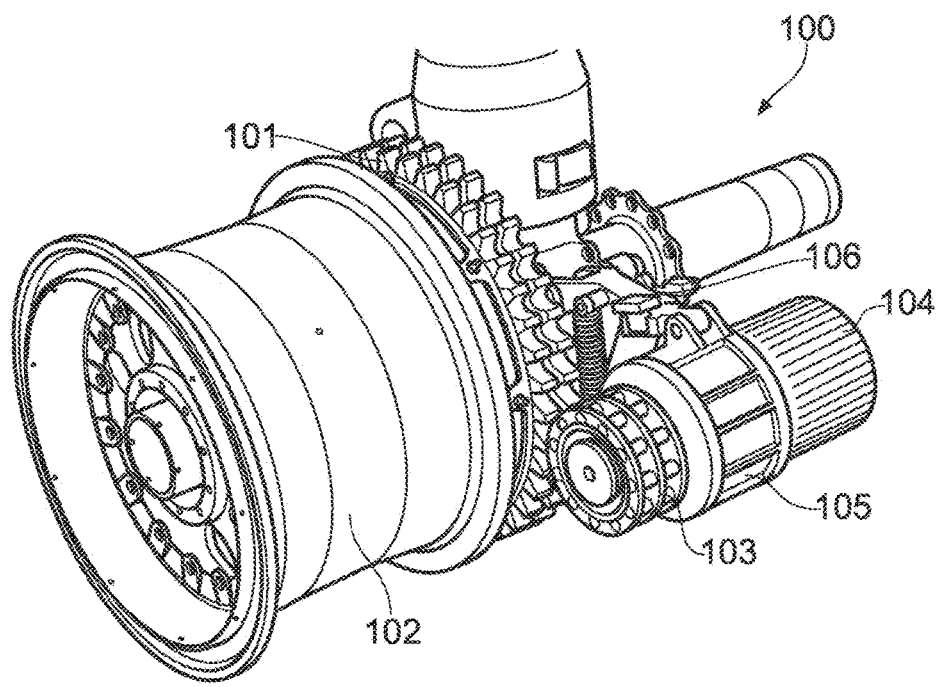
FIG. 4 shows an isometric view of a drive system according to a third embodiment.
Figure 5:
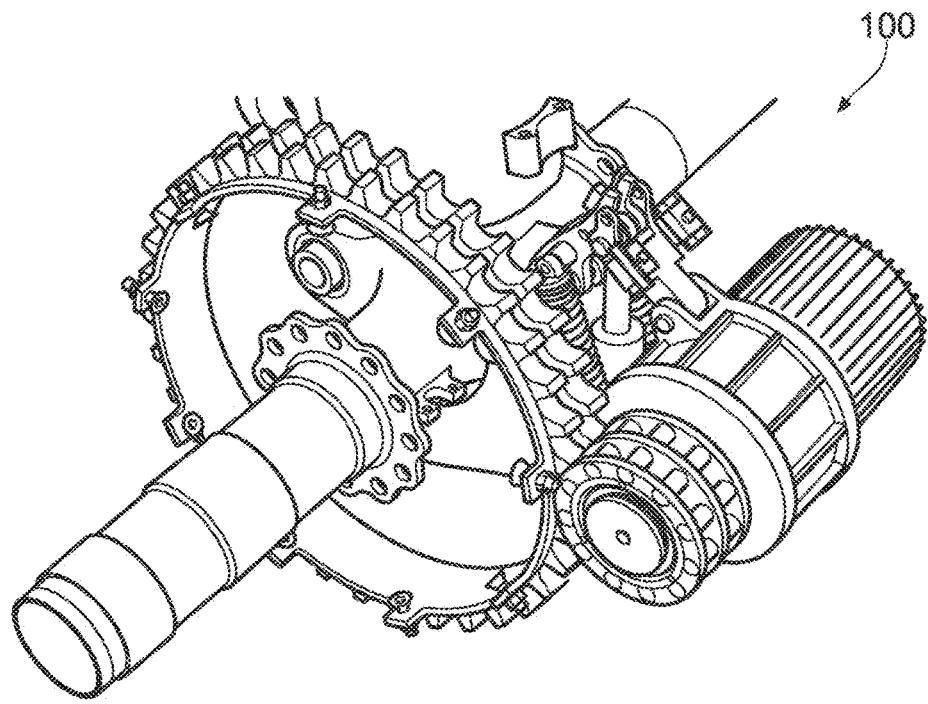
FIG. 5 shows the drive system of FIG. 4 with the pinion in a meshing position.

FIG. 4 shows a landing gear 100 incorporating a sprocket-roller gear drive system of the kind shown in FIG. 3. A driven rim-gear 101 is mounted to a wheel 102. A roller-gear pinion 103 is driven by a motor 104 via an epicyclic gear box 105. An actuator (not shown) can move the pinion 103, gear box 105 and motor 104 from a neutral position shown in FIG. 4 to a meshing position shown in FIG. 5. Lock links 106 lock the, pinion in the meshing position of FIG. 5.

A method of engaging the drive system of FIG. 4 with a rotating wheel will now be described with reference to FIGS. 6-10. The method described below can equally be applied to the drive systems of FIGS. 1-3.

Figure 7A:
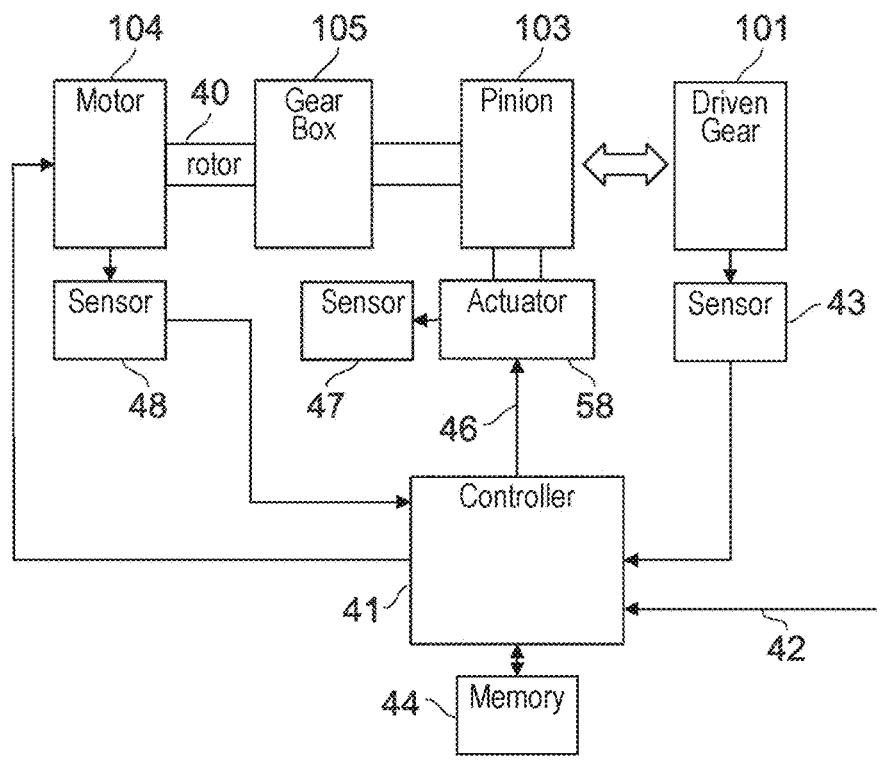
FIG. 7a is a block diagram of the various elements of the drive system.
Figure 7B:
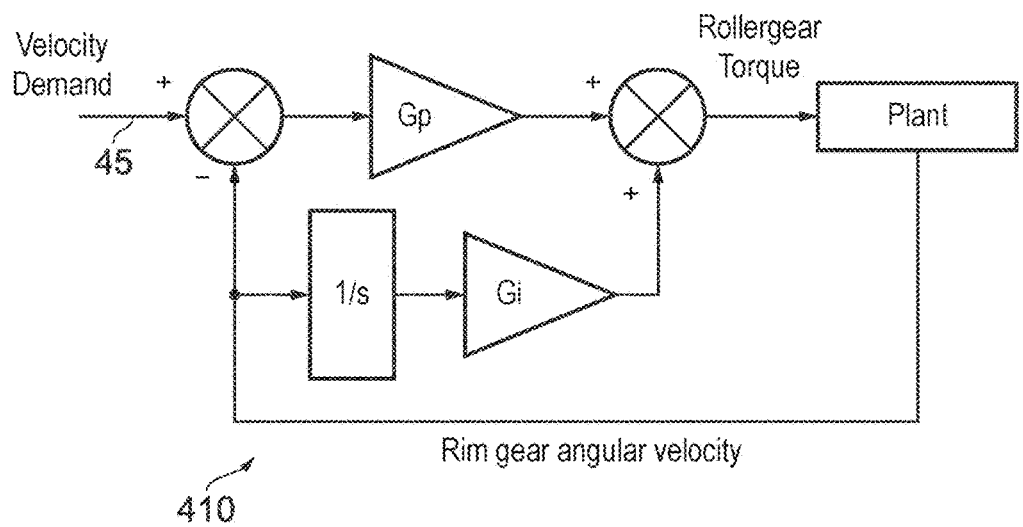
FIG. 7b shows a PI controller.

FIG. 7a is a schematic diagram showing the main elements of the drive system. The motor 104 has a rotor 40 which drives the pinion 103 via the gear box 105. The drive system comprises a controller 41 which is configured to operate according to the process of FIG. 10.

On receipt of an engagement request 42. (from the pilot of the aircraft for example) in step 400 a measurement is taken by a sensor 43 to determine the current angular velocity of the driven gear. The motor is then commanded to apply torque at step 401 to the pinion so that the pinion starts rotating. The applied torque is controlled by a proportional-integral (PI) torque control loop 410 shown in FIG. 7b so that the pinion accelerates in a spin-up phase up to a desired angular velocity. The desired angular velocity is controlled by a velocity demand input 45 to the control loop from the controller 41. The velocity demand input 45 is determined by the controller 41 in accordance with a current angular velocity of the driven gear measured by the sensor 43, the known gear ratio between the pinion and the driven gear, and a predetermined sync ratio stored in a memory 44.

Figure 6A:
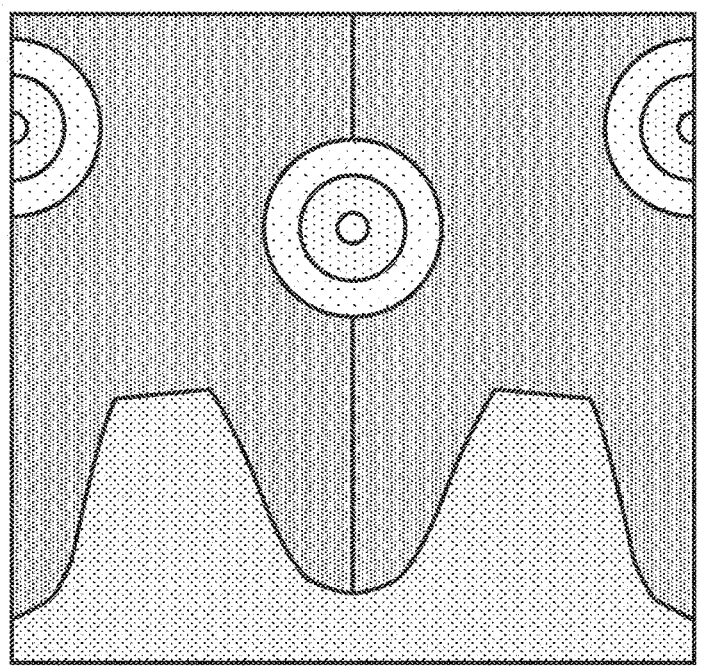
FIG. 6a shows part of a pinion and driven gear in a neutral unengaged position with an angular offset of 0c.

When the pinion has reached the desired angular velocity in step 402 at the end of the spin-up phase then the controller 41 suspends the roller gear torque control loop 410 and generates an engagement command 46 in step 403 which causes the linear actuator 58 to initiate an engagement phase during which the pinion moves into engagement with the driven gear. in a first part of the engagement phase the pinion moves from the neutral position of FIG. 6a to a contact position in which it contacts the rotating driven gear at an initial contact time. This initial contact time is the time at which the, pinion makes its first contact with the driven gear during the engagement phase. After this initial contact time, in a second part of the engagement phase the actuator 58 attempts to push the pinion further beyond the contact position to a meshing position where the pinion fully meshes with the driven gear, with the rollers positioned towards the base of the groove between the teeth of the driven gear. The centre-to-centre distance between the rotation axis of the pinion and the rotation axis of the driven gear reduces as the pinion moves to the contact position and to the meshing position. In other words, the motion of the pinion is not parallel with its axis of rotation but rather it is radial (or at least predominantly radial) with respect to its axis of rotation.

The driven gear has $N_{gear}$ teeth and the pinion has $N_{pinion}$, rollers which mesh with the teeth of the driven gear when the pinion is at the meshing position. $N_{gear}$ is greater than $N_{pinion}$. Typically $N_{gear}$ is 40 and $N_{pinion}$ is 11, giving a gear ratio of 40/11=3.64. This gear ratio is stored in the memory 44 along with the predetermined sync ratio.

The pinion and driven gear are rotating at angular velocities $\omega_{pinion}$ and $\omega_{gear}$ respectively as the pinion contacts the driven gear at the initial contact time. A sync ratio parameter $R=[(\omega_{pinion}*N_{pinion})/(\omega_{gear}*N_{gear})]$ determines the relative speed of the rollers of the pinion and the teeth of the driven gear at this initial contact time. If the sync ratio R is 1, then a point on the pitch circle of the pinion (i.e. the centre of one of the rollers) is travelling at the same speed as a point on the pitch circle of the driven gear (about half way up one of the teeth).

Figure 8:
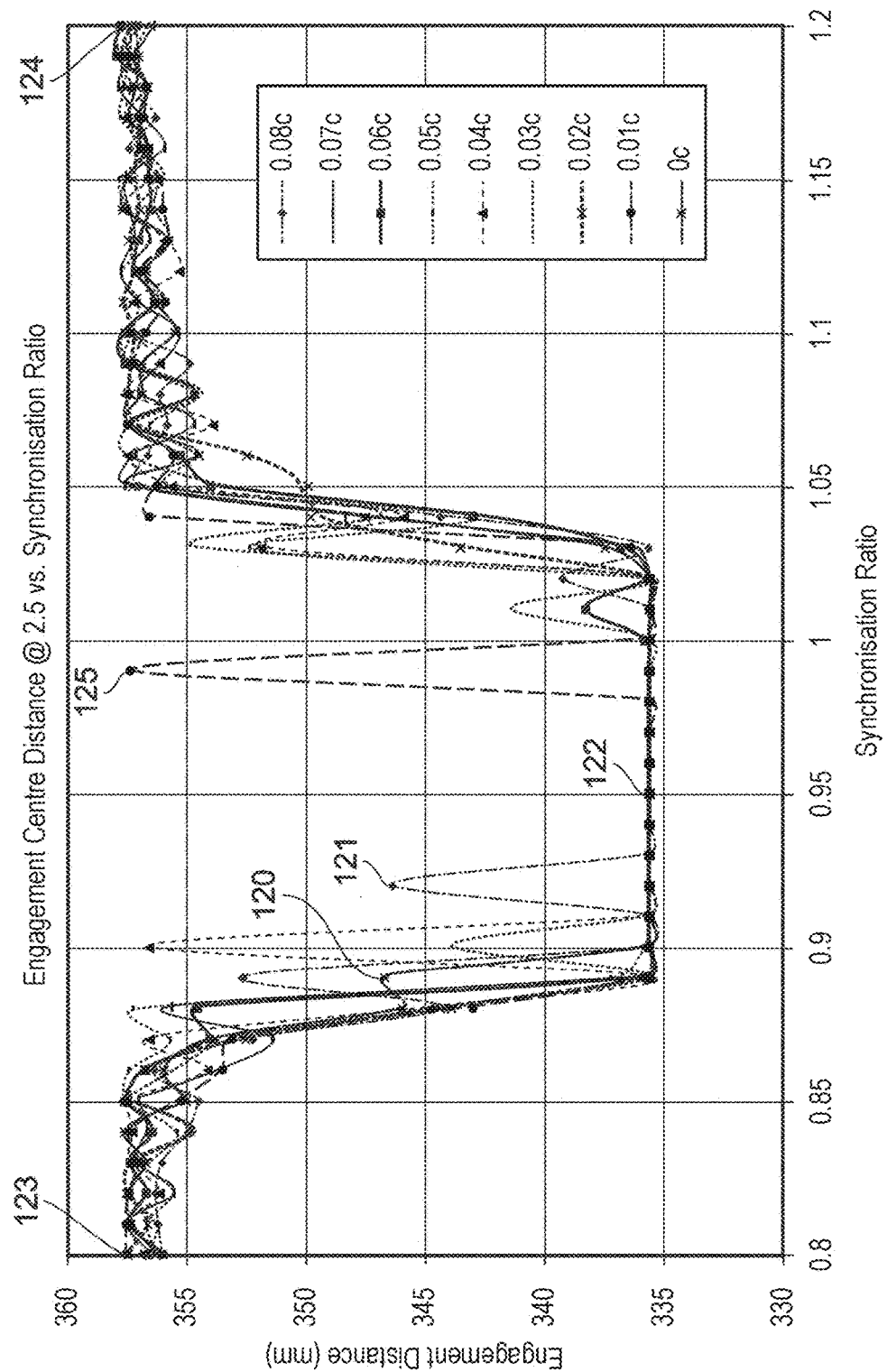
FIG. 8 is a graph showing centre-to-centre distance after 2.5 s for a variety of sync ratios and angular offsets.

The sync ratio at the initial contact time must be chosen to achieve meshing of the gears without significant actuation force from the actuator 58. FIG. 8 is a graph illustrating the effect of varying the sync ratio. The X-axis in FIG. 8 represents the predetermined sync ratio stored in the memory, and the Y-axis represents a centre-to-centre distance between the pinion and driven gear. FIG. 8 is derived from a computer model which models the behaviour of the pinion as it is engaged. The computer model assumes that the driven gear is rotating at $\omega_{gear}$, the pinion is being driven radially towards the driven gear by the actuator with a given force, and the pinion is being spun at a particular angular velocity based on a given predetermined sync ratio. Each data point in FIG. 8 represents the centre-to-centre distance 2.5 seconds after the engagement command, for a given sync ratio and a given angular relative position of the gears when the computer model starts to run. So for example data point 120 is associated with a run of the computer model which starts at the "0c" angular relative position shown in FIG. 6a (in which a roller of the pinion is aligned with a groove between the teeth of the driven gear) with a sync ratio of about 0. In this case the pinion and driven gear have not meshed fully, resulting in a centre-to-centre distance of about 347 mm after 2.5 s. On the other hand data point 121 is associated with a run of the computer model which starts at the "0.08c" angular relative position shown in FIG. 6b (in which a roller of the pinion is aligned with a tooth of the driven gear) with a sync ratio of about 0.92. Again the pinion and driven gear have not meshed fully, resulting in a centre-to-centre distance of about 347 mm after 2.5 s. Data point 122 on the other hand shows a successful meshing operation based on a sync ratio of 0.95. In this case the centre-to-centre ratio is about 336 mm, indicating that the pinion and driven gear have meshed fully.

Data point 123 on the other hand shows an unsuccessful meshing operation based on a low sync ratio of 0.8. In this case the centre-to-centre ratio is about 357 mm which is close to the centre-to-centre distance at the neutral position of FIGS. 6a and 6b. This indicates that for this low sync ratio the pinion has been repeatedly forced back by a series of tooth to roller impacts, and completely failed to mesh. Similarly data point 124 shows an unsuccessful meshing operation based on a high sync ratio of 1.2. In this case the centre-to-centre ratio is also about 357 mm which is close to the centre-to-centre distance at the neutral position of FIGS. 6a and 6b. This indicates that for this high sync ratio the pinion has been repeatedly forced back by a series of tooth to roller impacts, and completely failed to mesh.

Figure 6B:
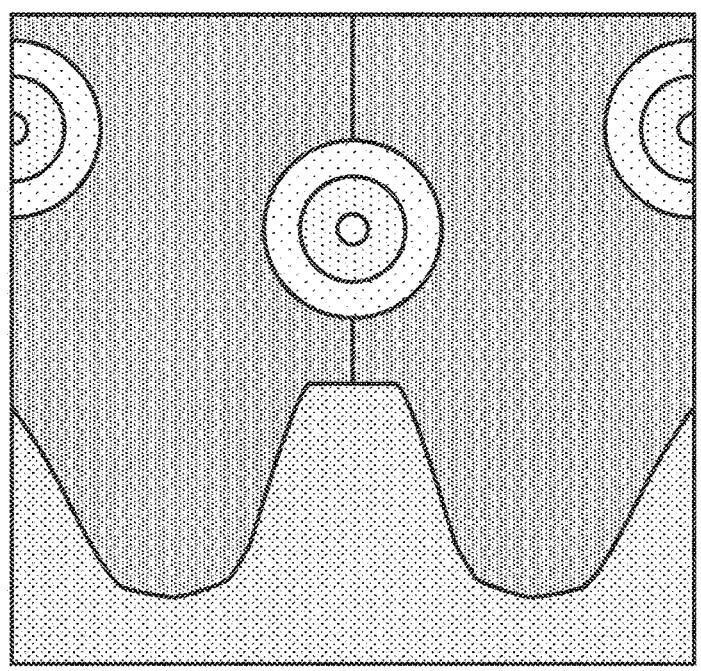
FIG. 6b shows part of a pinion and driven gear in a neutral unengaged position with an angular offset of 0.08c.

It should be noted that no position sensor is available so the angular relative position between the pinion and the driven gear is not known. In other words, as the pinion comes into contact with the driven gear it may be perfectly aligned (as shown in FIG. 6a) with the rollers between the teeth, or there may be a clash (as shown in FIG. 6b) with the rollers aligned with the teeth.

FIG. 8 shows that there is a "window" of optimal sync ratio between about 0.9 and 1 in which the pinion and gear are able to mesh successfully. increasing the force applied by the actuator 58 has the effect of widening this window, but at the expense of increasing tooth loading, noise and vibration. Also, increasing the inertia in the drive train from the pinion to the motor would have the effect of narrowing the window.

Surprisingly, a sync ratio of 1 has been found to be undesirable, as evidenced by the data point 125. This data point 125 shows a run of the computer model in which the sync ratio is approximately 1, and the pinion repeatedly "skips" off the teeth of the driven gear.

Another surprising feature of FIG. 8 is that it shows that a sync ratio of 1 is at the upper end of the window rather than its mid-point. In other words, FIG. 8 shows that an ideal sync ratio is slightly less than 1—of the order of 0.95. This asymmetry is observed to increase as the computer model is changed to use a higher actuation force—that is, the window increases further out to the left in FIG. 8 than to the right.

These two surprising features of FIG. 8 suggest two related conclusions. The first feature suggests that bringing the pinion and driven gear together at a sync ratio of 1 (at which the rollers and teeth are moving at essentially the same speed) is undesirable. The second feature suggests that that moving the rollers slower than the teeth (i.e. with a sync ratio less than 1) is desirable. Consequently the velocity demand input 45 is chosen so that the sync ratio $[(\omega_{pinion}*N_{pinion})/(\omega_{gear}*N_{gear})]$ at the initial contact time is less than 1.

As noted above, when the pinion has reached the desired angular velocity (determined by the velocity demand input 45) at the end of the spin-up phase in step 402 then the actuator moves the pinion into engagement with the driven gear in response to an engagement command 46 in step 403. This engagement command is also used as a trigger to suspend torque control from the control loop 410 and reduce the output torque of the motor 104, ideally to zero or at least below some predetermined low level stored in the memory 44 (which typically represents a reduction of 90% or more compared with the torque being applied immediately before receipt of the engagement command). This initiates a spin-down phase in which the rotor 40 is no longer applying significant torque to the pinion so the pinion will gradually start to slow down. The motor maintains the torque at zero (or below the predetermined low level) at least until the pinion has reached the contact position at the initial contact time, and possibly for longer. It is expected that the period of time between receipt of the engagement command and the initial contact time will be relatively short (of the order of 0.5 s) so the reduction in angular velocity of the pinion will be relatively small. As a result the angular velocity of the pinion at the initial contact time will be $(\omega_{pinion}-\Delta)$, where $\Delta$ is the small reduction in angular velocity during the spin-down phase. Equivalently the sync ratio of the pinion at the initial contact time will be $(R-\delta)$, where $R$ is the predetermined sync ratio stored in the memory 44, and $\delta$ is the small reduction in sync ratio during the spin-down phase.

Reducing (or completely eliminating) the torque being applied by the motor at the initial contact time inputs less energy into the system and improves the probability of a successful meshing operation.

In the example given above, the engagement command 46 to the actuator acts as a trigger to initiate the spin down phase. However other trigger signals may be used as a trigger to cause the motor to reduce its torque output and initiate the spin down phase. For example a sensor 47 may detect when the centre-to-centre distance falls below a predetermined threshold (after die engagement command but before the initial contact time) and the controller uses that as a trigger. Alternatively the engagement command 46 may be used as a trigger, but the spin down phase delayed by some pre-determined time rather than being immediately initiated. Alternatively the detection of the desired angular velocity at the end of the spin-up phase may be used as a torque reduction trigger rather than the engagement command itself.

After the initial contact time the spin-down phase comes to an end, and the motor can now increase the torque above the low level via a gradual ramp in step 406 after the meshing position has been achieved at step 408, or in a torque control step 405 before the meshing position has been achieved. This torque control step 405 is described below.

During the meshing phase (i.e. after the initial contact time but before the pinion has reached the meshing position) the driven gear contacts the pinion inn a series of impacts, each impact induces a back electromotive force (EMF) spike in the motor and also a related spike in angular velocity of the rotor 40. The polarity of the EMF/velocity spike will depend on which side of a tooth is impacting the roller (i.e. the impact may have the effect of speeding up the roller, or slowing it down). A sensor 48 is arranged to detect the amplitude and polarity of these spikes, and the controller 41 is configured to vary the torque applied to the pinion in response to this detection. The sensor 48 may sense the EMF of the motor 104, or the angular velocity of the rotor 40 (using a resolver for example). If the sensor 48 detects a positive spike indicating that the pinion speed has been increased by a tooth impact, then the motor is commanded to reduce its output torque by a fixed magnitude. Alternatively if the sensor detects a negative spike indicating that the pinion has been slowed down by a tooth impact, then the motor is commanded to increase its output torque by a fixed magnitude. The torque control loop based on the detection of these spikes is illustrated by steps 404 and 405 in FIG. 10.

If it is detected at step 407 that the pinion angular velocity has moved outside a defined velocity window relative to the driven gear, then the control returns to the torque control loop 410 so the pinion is driven by the motor back to a desired velocity.

Figure 9:
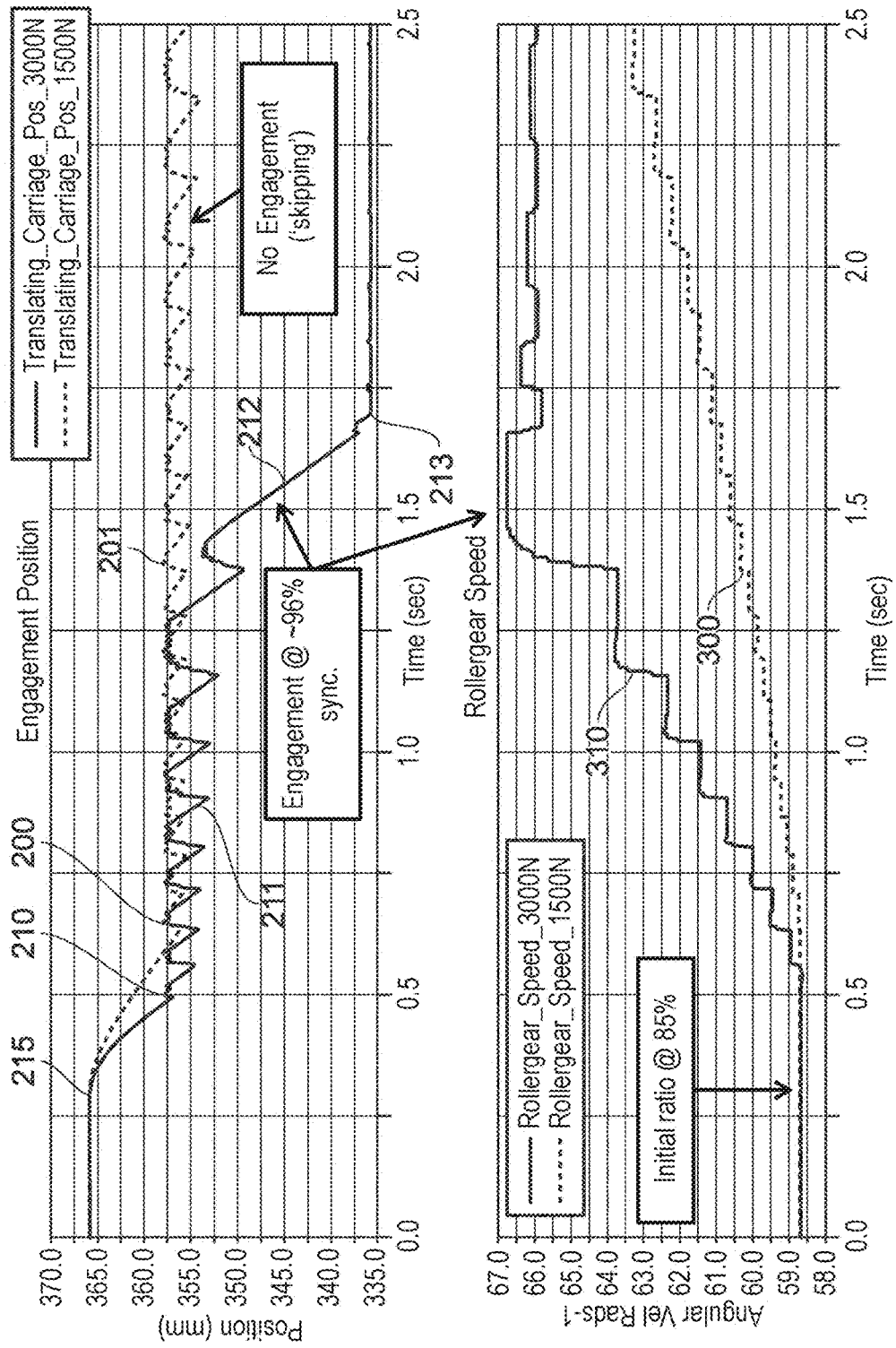
FIG. 9 is a pair of graphs comparing centre-to-centre distance and pinion angular velocity for low and high engagement forces.
Figure 10:
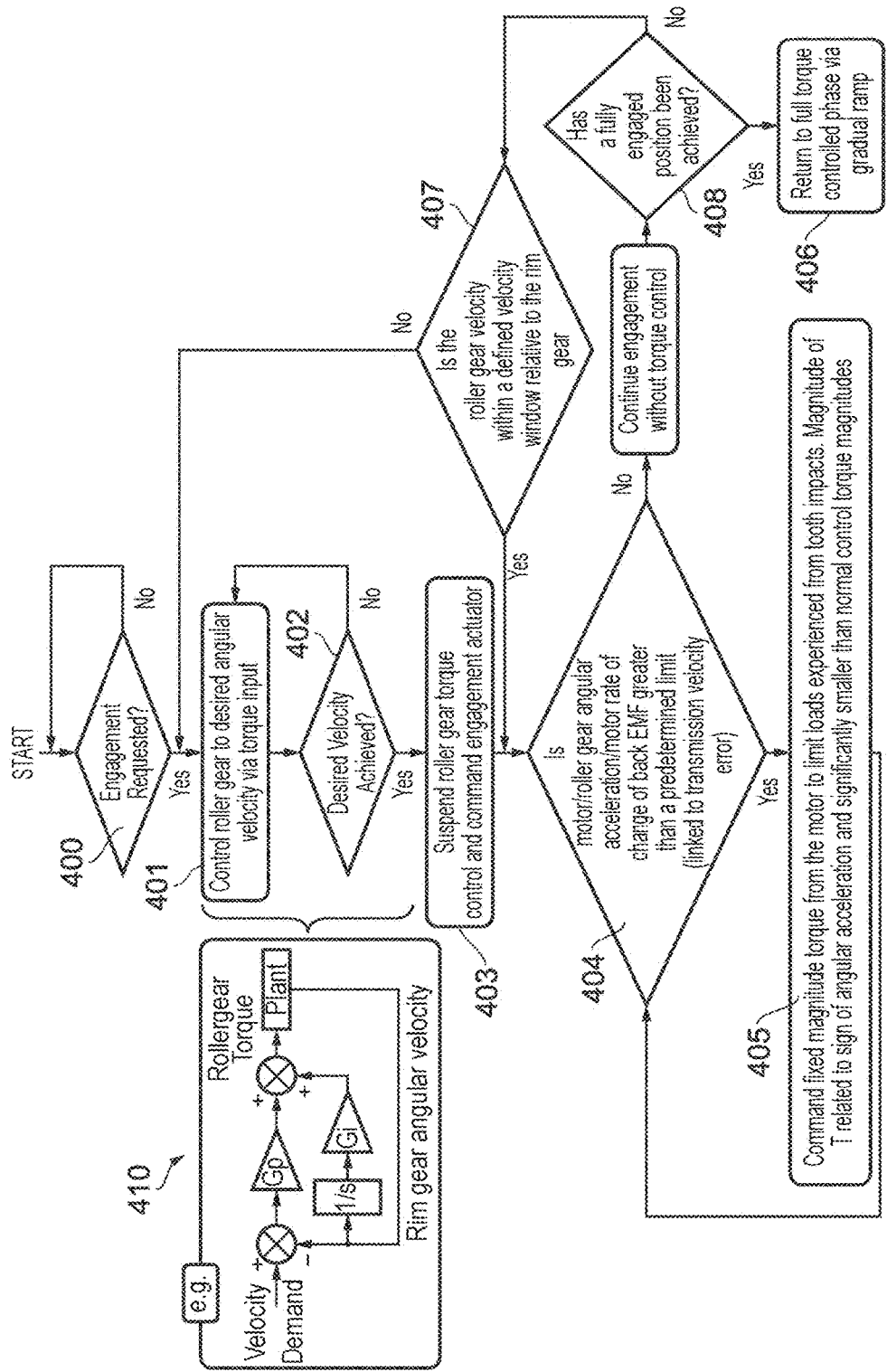
FIG. 10 shows a control method.

FIG. 9 shows a pair of graphs. The top graph has a first trace showing the centre-to-centre distance over time for a first computer model with an actuation force of 1500N, and a second trace showing the centre-to-centre distance over time for a second computer model with an actuation force of 3000N. The first trace shows an initial contact at initial contact time 200, followed by a series of spikes 201 caused by impacts in which the pinion "skips" off the driven gear (note that an equivalent series of EMF/velocity spikes will be detected at the motor by the sensor 48). The pinion in this case never reaches the meshing position (centre-to-centre distance 336 mm). The second trace shows a first contact at initial contact time 210, followed by a series of spikes 211 caused by impacts during the meshing phase, followed by a continuous drop 212 in centre-to-centre distance as the pinion moves to the meshing position 213. For both traces the controller issues the engagement command to the actuator at an engagement time 215.

The bottom graph in FIG. 9 shows traces from the same two computer models, this time shown the angular velocity of the pinion. The initial angular velocity is low (the predetermined sync ratio stored in the memory 44 being 0.85). For the first computer model with the lower actuation force, the trace shows a series of small steps 300 in which the angular velocity increases. The high inertia of the drive path between the motor and the pinion means that the impacts have limited effect on the angular velocity of the pinion. For the second computer model with the higher actuation force, the trace shows a series of larger steps 310 as the pinion moves to the meshing position. This demonstrates that with a greater engagement load each impact imparts more force to the pinion so that it can drop into engagement at a sync ratio of about 0.96 (both computer models begin at a predetermined sync ratio of 0.85). Clearly each impact is sub-optimal, and increasing the force increases shock, loads and noise.

The embodiments described above are suitable only for ground taxiing operations but could be modified (e.g. by adjustment of the gearbox ratio) to be suitable for only pre-landing spin-up operations. In the taxiing configuration the linear actuator 58 (which may be back drivable) may be torque controlled (or current controlled) to apply a substantially constant load between the pinion and the driven gear, thereby allowing for some deformation of the various component parts of the drive system while at the same time preventing unwanted separation. An electro mechanical brake (not shown), or other similar blocking device, may be integrated within the actuator 58 to lock the actuator in the disengaged (second) configuration.

In each of the arrangements described above the principle of achieving drive via meshing between a sprocket and roller gear/roller chain can be applied when the driven gear comprises the sprocket and the drive pinion comprises the roller gear/roller chain, and vice versa.

Although the figures only show features of the drive system for driving one of the wheels, it is envisaged that these features may be mirrored for the other wheel. That is, it is envisaged that one drive system may be provided for each wheel. For a landing gear with four or more wheels, a drive system may be provided for each of the wheels, or for only two of them. In embodiments in which only two of the wheels are provided with drive systems, it may be necessary to provide further motors (not shown) to achieve pre-landing spin-up of the un-driven wheels, with ground taxiing being accomplished by the two drive systems. In other embodiments it may be possible to have one motor shared between two drive systems. That is, the motor may be arranged to rotate the input shaft of the gearbox of each drive system.

Although the figures only show the drive system 50 supported by a bracket 56 which is rigidly connected to the axle 14 of the landing gear, the drive system 50 may alternatively be mounted on the upper telescopic part 12*a* (main fitting) or lower telescopic part 12*b* (slider).

Although the invention has been described above with reference to one or more preferred embodiments, it will be appreciated that various changes or modifications may be made without departing from the scope of the invention as defined in the appended claims.

The invention claimed is:

1. A method of engaging a drive system with a rotating wheel of an aircraft landing gear, the method comprising:
   operating a motor to apply torque to a pinion so the pinion rotates;
   issuing an engagement command to an actuator at an engagement time;
   operating the actuator in response to the engagement command to move the pinion from a neutral position to a contact position in which it contacts a rotating driven gear at an initial contact time, the rotating driven gear being mounted to the rotating wheel of the aircraft landing gear;
   then after the initial contact time operating the actuator to move the pinion further to a meshing position where the pinion meshes with the driven gear, wherein a center-to-center distance between the pinion and the driven gear reduces as the pinion moves to the contact position and to the meshing position, and the method further comprises operating the motor to reduce the torque to below a predetermined level at or after the engagement time, maintain the torque below the predetermined level until the initial contact time, then after the initial contact time increase the torque above the predetermined level, wherein the driven gear has $N_{gear}$ teeth or rollers, the pinion has $N_{pinion}$ teeth or rollers which mesh with the teeth or rollers of the driven gear when the pinion is at the meshing position, the pinion and driven gear are rotating at angular velocities $\omega_{pinion}$ and $\omega_{gear}$ respectively at the initial contact time, and a sync ratio $((\omega_{pinion}*N_{pinion})/(\omega_{gear}*N_{gear}))$ at the initial contact time is not 1.

2. The method of claim 1 wherein the method comprises operating the motor to reduce the torque to substantially zero at or after the engagement time, maintain the torque at substantially zero until the initial contact time, then after the initial contact time increase the torque above substantially zero.

3. The method of claim 1 wherein the pinion or driven gear is a roller gear with rollers which mesh with teeth of the driven gear or pinion, respectively.

4. The method of claim 1 wherein the method comprises increasing the torque above the predetermined level after the pinion has moved to the meshing position.

5. The method of claim 1 wherein the method comprises increasing the torque above the predetermined level before the pinion has moved to the meshing position.

6. The method of claim 1 wherein the sync ratio $((\omega_{pinion}*N_{pinion})/(\omega_{gear}*N_{gear}))$ at the initial contact time is less than 1.

7. The method of claim 6 wherein the sync ratio $((\omega_{pinion}*N_{pinion})/(\omega_{gear}*N_{gear}))$ at the initial contact time is less than 0.98.

8. The method of claim 7 wherein the sync ratio $((\omega_{pinion}*N_{pinion})/(\omega_{gear}*N_{gear}))$ at the initial contact time is less than 0.96.

9. The method of claim 1 wherein the sync ratio $((\omega_{pinion}*N_{pinion})/(\omega_{gear}*N_{gear}))$ at the initial contact time is less than 0.98 or greater than 1.02.

10. The method of claim 1 wherein the driven gear contacts the pinion in a series of impacts as the pinion moves from the contact position to the meshing position, each impact induces a spike in electromotive force or angular velocity at the motor, and the method further comprising operating the motor to increase the torque above the predetermined level after the initial contact time in response to the detection of one of the spikes.

11. A drive system for rotating a wheel of an aircraft landing gear, the drive system comprising:

a pinion;

a driven gear adapted to be mounted to the wheel of the aircraft landing gear;

a motor arranged to apply torque to the pinion so the pinion rotates;

an actuator which is responsive to an engagement command at an engagement time to move the pinion from a neutral position to a contact position in which it contacts the driven gear at an initial contact time;

then after the initial contact time to move the pinion further to a meshing position where the pinion meshes with the driven gear, wherein a center-to-center distance between the pinion and the driven gear reduces as the pinion moves to the contact position and to the meshing position, and the drive system further comprises a controller which is configured to operate the motor to reduce the torque to below a predetermined level at or after the engagement time, maintain the torque below the predetermined level until the initial contact time, then after the initial contact time increase the torque above the predetermined level, wherein the driven gear has $N_{gear}$ teeth or rollers, the pinion has $N_{pinion}$ teeth or rollers which mesh with the teeth or rollers of the driven gear when the pinion is at the meshing position, the pinion and driven gear are rotating at angular velocities $\omega_{pinion}$ and $\omega_{gear}$ respectively at the initial contact time, and a sync ratio $((\omega_{pinion}*N_{pinion})/(\omega_{gear}*N_{gear}))$ at the initial contact time is not 1.

12. The drive system according to claim 11, wherein the drive system is supported by a bracket which is rigidly connected to an axle, main fitting or slider part of a landing gear.

13. The drive system according to claim 12, wherein the bracket includes two lugs comprising half-moon clamps to permit ready attachment and detachment of the bracket.

* * * * *